(12) United States Patent
Jeske

(10) Patent No.: US 7,844,358 B2
(45) Date of Patent: Nov. 30, 2010

(54) METHOD FOR MATERIAL HANDLING, MATERIALS HANDLING CELL AND ELECTRIC MOTOR THEREFOR

(75) Inventor: Hardy Jeske, Bonndorf (DE)

(73) Assignee: Dunkermotoren GmbH, Bonndorf/Schwarzwald (DE)

( * ) Notice: Subject to any disclaimer, the term of this patent is extended or adjusted under 35 U.S.C. 154(b) by 71 days.

(21) Appl. No.: 11/851,387

(22) Filed: Sep. 6, 2007

(65) Prior Publication Data
US 2008/0077254 A1    Mar. 27, 2008

(30) Foreign Application Priority Data
Sep. 7, 2006    (EP)    ..................  06300933

(51) Int. Cl.
*G06F 19/00*    (2006.01)
*B65G 1/04*    (2006.01)
(52) U.S. Cl. ............... 700/112; 700/2; 700/8; 318/594; 414/501
(58) Field of Classification Search ............ 700/2, 700/8, 112; 414/267, 276, 501; 318/146, 318/594; 187/291
See application file for complete search history.

(56) References Cited

U.S. PATENT DOCUMENTS

| | | | | |
|---|---|---|---|---|
| 3,873,902 A * | 3/1975 | Burch | ............... | 318/594 |
| 4,347,563 A | 8/1982 | Paredes et al. | | |
| 6,085,892 A * | 7/2000 | Lem et al. | ............... | 198/370.09 |
| 6,378,687 B1 * | 4/2002 | Lem et al. | ............... | 198/349.95 |

| | | | |
|---|---|---|---|
| 2009/0074545 A1 * | 3/2009 | Lert et al. | ............ 414/276 |

FOREIGN PATENT DOCUMENTS

| | | | |
|---|---|---|---|
| CN | 678715 | A5 | 10/1991 |
| DE | 4115327 | A1 | 11/1992 |
| DE | 19613814 | A1 | 10/1997 |
| WO | WO 98/22857 | A | 5/1998 |
| WO | WO 99/37563 | A1 | 7/1999 |
| WO | WO 00/71445 | A1 | 11/2000 |

OTHER PUBLICATIONS

Wolff T: "Machine-Mounted Control Takes Material Handling To New Level of Efficiency" I & CS—Industrial and Process Control Magazine, Chilton Company, Radnor, Pennsylvania, US, vol. 76, No. 1, Jan. 2003, pp. 38-41, XP009080412.

* cited by examiner

*Primary Examiner*—Albert DeCady
*Assistant Examiner*—Douglas S Lee
(74) *Attorney, Agent, or Firm*—Carmen Patti Law Group, LLC

(57) ABSTRACT

The invention relates to a method for materials handling via a number of materials handling cells by passing on materials handling containers, in which each materials handling cell includes a first electric motor and a first control unit, in which each materials handling container is assigned at least one data element including at least information about the way or the destination of the materials handling container, in which the data element is passed on to the next materials handling cell and stored there in the control unit, when the materials handling container is passed on there, and where the evaluation of the data element and the control of its passing on is performed in the first control unit contained in the first electric motor, as well as to a materials handling cell and to an electric motor therefor.

5 Claims, 2 Drawing Sheets

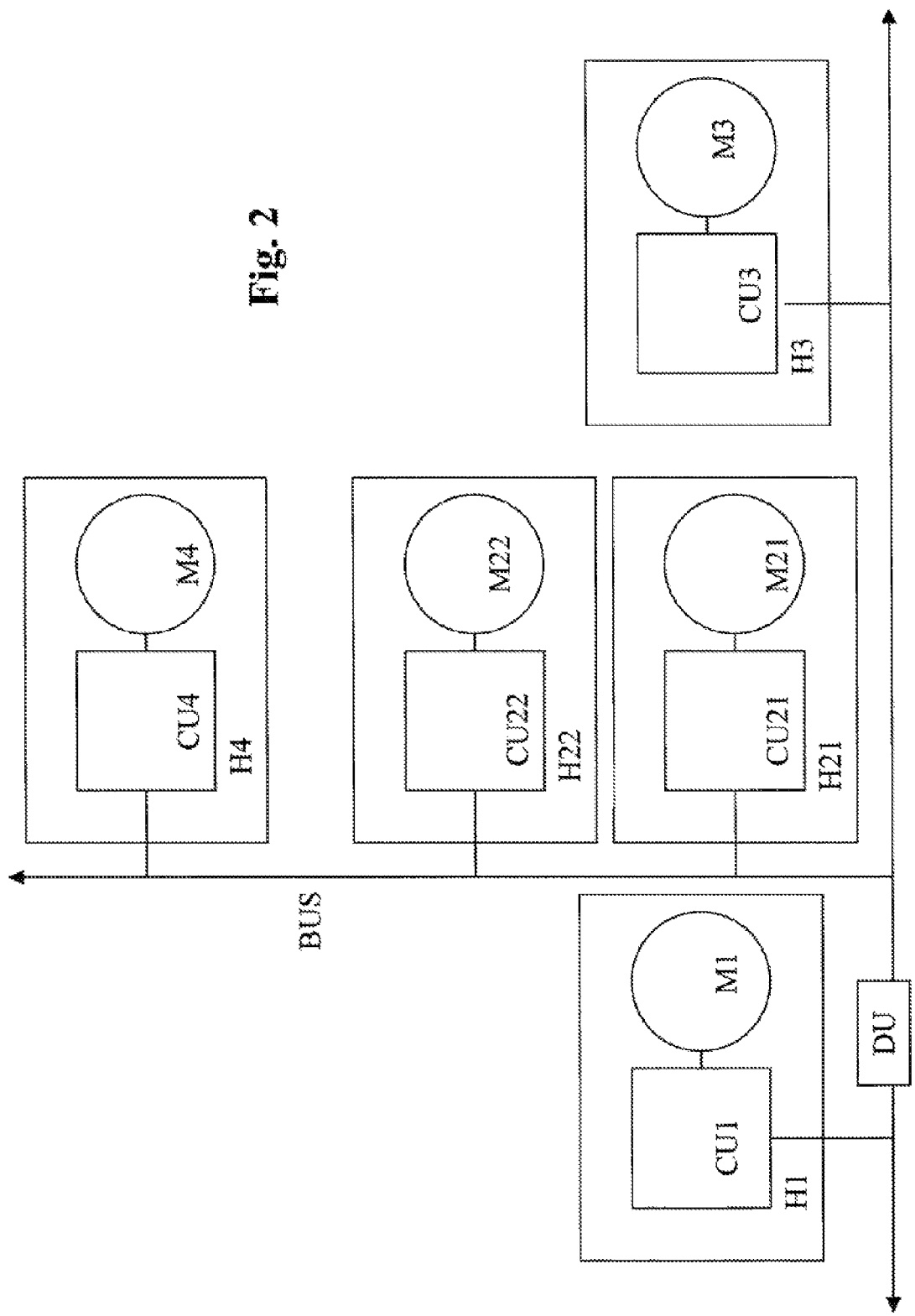

METHOD FOR MATERIAL HANDLING, MATERIALS HANDLING CELL AND ELECTRIC MOTOR THEREFOR

BACKGROUND OF THE INVENTION

The invention is based on a priority application EP 06300933.6 which is hereby incorporated by reference.

The invention relates to a method for materials handling via a number of materials handling cells by passing on materials handling containers, in which each materials handling cell includes a first electric motor and a first control unit, to a materials handling cell for passing on materials handling containers, with a first electric motor and a first control unit as a decentral or peripheral part of an overall control serving the cooperation of the materials handling cell with other materials handling cells, and to an electric motor therefor.

The article "Machine-mounted control takes material handling to new level of efficiency" by Tom Wolff, published in "Control Solutions", January 2003, vol. 76, pages 38-41, shows a modular materials handling system. This article also shows that even mere mechanical problems like housings are of high importance.

SUMMARY OF THE INVENTION

Here the invention finds a remedy with a method for materials handling via a number of materials handling cells by passing on materials handling containers, in which each materials handling cell includes a first electric motor and a first control unit, wherein each materials handling container is assigned at least one data element including at least information about the way or the destination of the materials handling container, in which the data element is passed on to the next materials handling cell and stored there in the first control unit, when the materials handling container is passed on there, and where the evaluation of the data element and the control of its passing on is performed in the first control unit contained in the first electric motor.

This object is further achieved by a materials handling cell for passing on materials handling containers, with a first electric motor and a first control unit as a decentral or peripheral part of an overall control serving the cooperation of the materials handling cell with other materials handling cells, wherein the first control unit is housed in a housing part that is identical with the housing of the first electric motor or combined with this to a housing unit.

This object is further achieved by an electric motor for the materials handling cell mentioned above.

The invention uses the fact that it is well known to include control elements up to micro-controllers within the housing of electric motors or within housing parts apt to be combined with the housing of the motor as such.

Further embodiments of the invention are to be found in the subclaims and in the description.

BRIEF DESCRIPTION OF THE DRAWINGS

FIG. 2 shows the motors and the control part of the material handling system of FIG. 1.

DETAILED DESCRIPTION OF THE DRAWINGS

Figure 1:
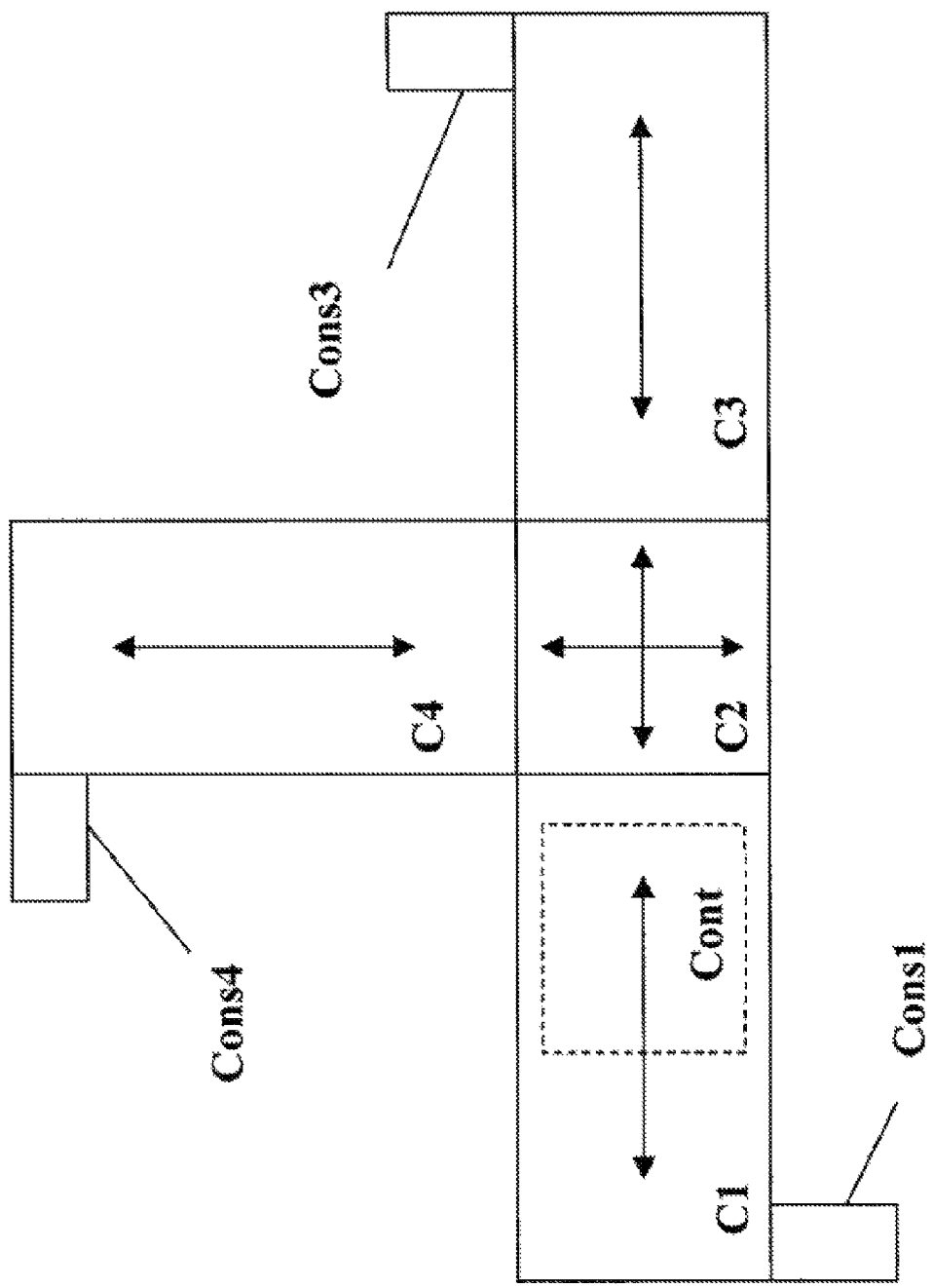
FIG. 1 shows a small materials handling system with material handling cells according to the invention, wherein the method according to the invention can be performed.

By means of FIG. 1 first a small material handling system will be described.

FIG. 1 shows four materials handling cells C1, C2, C3, and C4 as well as a materials handling container Cont (dashed lines).

Materials handling cells C1, C3, and C4 are provided with a console each, Cons1, Cons3, and Cons4.

The materials handling cells C1, C2, C3, and C4 carry double arrows to show the possible moving directions including the possible moving senses.

The materials handling cells C1, C3, and C4 can transport lengthwise with respect to the particular cell. They all can transport in both moving senses, namely to and fro. This can be achieved either by a conveyer band or by a number of parallel rolls.

The materials handling cell C2 can transport both, lengthwise and transverse, in each case in both moving senses. Apart from solutions with actuators being able to move in any direction there are two principle solutions known:

One solution uses a turning platform with a bridge on it build like a usual linear materials handling cell. Here both, for the turning and the linear movement separate motors are necessary.

An other solution works with parallel roles for one pair of direction and at least a pair of small conveyor bands placed between two roles each, for the crosswise directions. In this case it is usual to raise or lower the conveyor bands to be either higher than the rolls or lower. So either the rolls are activated or the conveyor bands. Here at least three motors are needed, one for the rolls, one for raising and lowering the conveyor bands and one for moving the bands.

As representatives for the contacts to the outer world in this simple example three consoles, Cons1, Cons3, and Cons4, are illustrated at the ends of the materials handling cells C1, C3, and C4 respectively, in each case at the end far from the materials handling cell C2.

This very simple example using consoles assumes that when one loads a container like the container Cont at one end of this system, one also enters data including at least information about the way or the destination of this container. Here it would address either of the two other material handling cells. On removing a container from the system one would have to confirm this removal at the respective console.

Instead of consoles for manual inputs also bar code scanners or readers for radio frequency identification cards could be used, assumed that respective data carriers be attached to the containers. The removal of a container could also simply be detected by light barriers.

Also the forwarding of a container from one cell to the next has to be noticed. This may either be done by calculating the covered way from the rotation of the motors and the geometry of the moving parts or by using sensors like light barriers.

Turning now to FIG. 2, where the motors and the control part of the system according to FIG. 1 is shown.

FIG. 2 shows five housings H1, H21, H22, H3, and H4 and a control bus BUS. A data unit DU is shown on the control bus BUS.

Each housing Hx like H1 includes a Motor Mx and a control unit CUx.

Each control unit CUx is connected on the one hand to the respective motor Mx and on the other hand to the control bus BUS.

The materials handling cell C2 in this example includes two housings H21 and H22 with a control unit CU21 and CU22 respectively and a motor M21 and M22 respectively. Though in this example both control units, CU21 and CU22, are connected to the control bus BUS, only one control unit, namely control unit CU21 acts as a master, the other, control unit CU22, acts as a slave and is controlled by its master CU21.

In case of needing three motors, of course we had two slaves and one master.

As there are electric motors on the market having not only an interface to the CAN bus, but also a data interface separated therefrom, the connection between master and slave or slaves could be realized independent from the control bus BUS. It would even be possible that the motor or motors other than the one directly connected to the master control unit CU21 does or do not have an own control unit, but is or are directly controlled by the master control unit CU21.

The control bus BUS is open for connecting further elements like the consoles or like sensors.

The control bus BUS is preferably a field bus like the widespread CAN (Controller Area Network) Bus. There are components like electric motors on the market with integrated control unit and an interface to a CAN bus.

Such electric motors often are brushless direct current motors, which in any case need a minimum of electronics inside the motor housing.

Each motor Mx is connected to and controlled by the respective control unit CUx. The technology for integrating control units into electric motors is well known. There are solutions where the housing of the motor is long enough to also contain electronic elements. Other known solutions use separate housing parts that fit to the housing part of the motor such that they build together a housing unit.

Though it would not make problems to use control units for controlling the motor as such and also to control further activities like the operating of a whole materials handling cell, it also would not make a technological problem to integrate two separate control units and thus to completely separate the software for both activities or to hardwire at least the control of the motor as such.

Each element connected to the control bus BUS has its address and can be addresses separately. Affected are not only the control units CUx, but also consoles Consx as well as any possible sensor.

As we assume here a decentralized control, each such element only has to know the addresses of those elements, to which it is either assigned or neighbored. So each materials handling cell has to know the address of neighboring cells. Each input means like a console or a sensor has to know the address of the cell to which it is assigned. If there exist output means then their address has to be known by the cell to which it is assigned.

Assume that a container Cont is placed on cell C1 and a data unit DU relating to the way or the destination of this container is input at console Cons1 or is derived from what is input there. As console Cons1 is assigned to cell C1, this data unit DU is addressed and forwarded to the control unit CU1 in cell C1. Cell C1 has only the possibility to output a container or to forward it to cell C2, in this example it will forward it to cell C2. To this end first by means of a handshaking process between control unit CU1 and control unit CU2 it is checked, whether forwarding can be performed now. Then motor Ml is activated by control unit CU1 until the container Cont left cell C1. This is assumed to have happened after a certain number of revolutions of the motor Ml, after a certain time, after receiving a respective signal from a sensor or after receiving a respective message from control unit CU21 in cell C2. When forwarding a container from cell C1 to cell C2, control unit CU1 of cell C1 forwards the data unit DU assigned to this container Cont to the control unit CU21 of cell C2.

Control unit CU21 of cell C2 activates the motor M21 to complete the forwarding of container Cont, when receiving the data unit DU from control unit CU1 of cell C1. Then the data unit DU is interpreted in order to know what to do next with this container Cont.

If the data unit DU includes information to further forward the container Cont to cell C3. After a further handshaking process this is done by further activating motor M21 until the container Cont has left cell C2. Data unit DU is sent from control unit CU21 in cell 2 to control unit CU3 in cell C3. Cell C3 is cleared by taking away the container Cont and confirming this at console Cons3. The confirmation entered at console Cons3 will be sent to control unit CU3 in cell3, where the hint to container Cont is deleted.

If, on the other hand, container Cont is to be forwarded from cell C2 to cell C4, the other motor or motors in cell C2 has or have to be activated from control unit CU21 via its or their integrated control units like control unit CU22. Then cell C4 will receive the container Cont. The remaining actions are corresponding to those mentioned above in connection with the forwarding to cell C3.

In the examples just described it would hardly make a difference whether data unit DU included the destination of the container Cont or the way it has to move. But even in this simple example it would be possible to enter a container at cell C1, first send it to cell C4 via cell C2, then to cell C3 via cell C2 and than back again to cell C1 via cell C2. Here of course the data unit DU would have to include not the destination, but the way to be taken.

The invention claimed is:

1. A method for materials handling via a number of materials handling cells, comprising the steps of passing on materials handling containers, wherein each materials handling container is assigned at least one data element, including at least information about a way or destination of the materials handling container;

passing on the data element to a next materials handling cell, wherein each materials handling cell includes a first electric motor and a first control unit;

storing the data element in the first control unit of the next materials handling cell, when the materials handling container is passed on there; and performing an evaluation of the data element and controlling passage of the data element and passage of the materials handling container by the first control unit, wherein the first control unit is housed in a housing of the first electric motor; and controlling the first electric motor as such by the first control unit for passage of the materials handling container.

2. A materials handling cell for passing on materials handling containers, comprising:

a first electric motor; and a first control unit as a decentral or peripheral part of an overall control serving the cooperation of the materials handling cell with other materials handling cells, wherein the first control unit is housed in a housing of the first electric motor and is configured to control the first electric motor as such;

wherein the first control unit is further configured to receive, from other materials handling cells, data elements assigned to materials handling containers, to store and evaluate the data elements, and to pass the data elements on to control units of other materials handling cells along with the materials handling cell;

wherein each data element includes at least information about a way or destination of the corresponding materials handling container.

3. An electric motor for the materials handling cell according to claim 2.

4. The materials handling cell according to claim 2, wherein the first electric motor is configured for passage of the materials handling containers in a first direction;

the materials handling cell further comprising at least one second electric motor configured for passage of the materials handling containers in at least one second direction;

wherein a second control unit of the second electric motor and the first control unit of the first electric motor are interconnected with one another, and that the first control unit of the first electric motor and the second control unit of the second electric motor cooperate like master and slave.

5. An electric motor according to claim 3, characterized in that it is a brushless direct current motor.

\* \* \* \* \*